(12) United States Patent
Chen et al.

(10) Patent No.: US 10,228,787 B2
(45) Date of Patent: Mar. 12, 2019

(54) DISPLAY DEVICE

(71) Applicant: InnoLux Corporation, Miao-Li County (TW)

(72) Inventors: Hung-Kun Chen, Miao-Li County (TW); Tsan-Chu Lu, Miao-Li County (TW); Chu-Hung Tsai, Miao-Li County (TW); Hsieh-Li Chou, Miao-Li County (TW); Li-Wei Sung, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 331 days.

(21) Appl. No.: 15/167,872

(22) Filed: May 27, 2016

(65) Prior Publication Data

US 2016/0357293 A1    Dec. 8, 2016

Related U.S. Application Data

(60) Provisional application No. 62/171,592, filed on Jun. 5, 2015.

(30) Foreign Application Priority Data

Oct. 12, 2015  (TW) ............... 104133349 A (51) Int. Cl.
    *G06F 3/041* (2006.01)
    *G06F 3/044* (2006.01)
(52) U.S. Cl.
    CPC ............ *G06F 3/0412* (2013.01); *G06F 3/044* (2013.01); *G06F 3/0416* (2013.01); *G06F 2203/04103* (2013.01)

(58) Field of Classification Search
    CPC .................. G06F 3/0412; G06F 3/044; G06F 2203/04103; G06F 2203/04111
    See application file for complete search history.

(56) References Cited

U.S. PATENT DOCUMENTS

2010/0194697 A1*  8/2010  Hotelling .............. G06F 3/0412
                                                         345/173
2012/0133607 A1*  5/2012  Chiu ....................... G06F 3/041
                                                         345/174

(Continued)

FOREIGN PATENT DOCUMENTS

CN        101498851        8/2009
CN        102569190        2/2014

*Primary Examiner* — Amare Mengistu
*Assistant Examiner* — Crystal Mathews
(74) *Attorney, Agent, or Firm* — McClure, Qualey & Rodack, LLP (57) ABSTRACT

A display device is provided. The display device includes a first substrate, wherein the first substrate includes: a scan line extending along a first direction; a thin-film transistor, including a source electrode, a drain electrode and a channel region disposed between the source electrode and the drain electrode; a data line intersecting with the scan line and extending along a second direction, wherein the source electrode is a portion of the data line, and the thin-film transistor is coupled to the data line and the scan line; and a touch signal line is disposed above the data line, wherein the touch signal line does not overlap with the channel region; a second substrate; and a display medium disposed between the first substrate and the second substrate.

12 Claims, 9 Drawing Sheets

(56) References Cited

U.S. PATENT DOCUMENTS

| | | | |
|---|---|---|---|
| 2012/0218199 A1* | 8/2012 | Kim | G06F 3/0412 |
| | | | 345/173 |
| 2012/0249444 A1* | 10/2012 | Lee | G06F 3/0412 |
| | | | 345/173 |
| 2012/0268396 A1* | 10/2012 | Kim | G06F 3/0412 |
| | | | 345/173 |
| 2016/0034096 A1* | 2/2016 | Chen | G06F 3/0416 |
| | | | 345/174 |
| 2016/0187694 A1* | 6/2016 | Kim | G06F 3/0412 |
| | | | 349/12 |
| 2016/0216544 A1* | 7/2016 | Chae | G02F 1/13338 |
| 2016/0253023 A1* | 9/2016 | Aoyama | G06F 3/0416 |
| | | | 345/174 |
| 2016/0291776 A1* | 10/2016 | Li | G06F 3/0416 |
| 2016/0357291 A1* | 12/2016 | Chen | G06F 3/0412 |
| 2017/0017327 A1* | 1/2017 | Chang | G06F 3/0412 |
| 2017/0307933 A1* | 10/2017 | Chen | G02F 1/13338 |
| 2017/0363903 A1* | 12/2017 | Jung | G02F 1/13452 |

* cited by examiner

DISPLAY DEVICE

CROSS REFERENCE TO RELATED APPLICATIONS

This application claims priority of Taiwan Patent Application No. 104133349, filed on Oct. 12, 2015. This application also claims the benefit of priority from a provisional application of, U.S. Patent Application No. 62/171,592 filed on Jun. 5, 2015 and the entirety of which is incorporated by reference herein.

BACKGROUND OF THE INVENTION

Field of the Invention

The disclosure relates to a display device, and in particular to a display device which may receive touch signals.

Description of the Related Art

As technology progresses, several information devices such as mobile phones, tablet PCs, ultra-thin laptops, and satellite navigation are being developed. In addition to using a keyboard or mouse to key in data and control the operation of such devices, another popular way to control information devices is through touch technology. A touch display device has a user-friendly and intuitive user interface so that users of all ages may select or control their information devices using their fingers or a stylus.

One type of touch display device is the in-cell touch display device, which has a sensing electrode disposed in the display panel (which may be a liquid-crystal display panel). However, existing in-cell touch display devices have not been satisfactory in every respect. For example, in these touch display devices, the touch signal line is disposed above the data line. Due to poor design, the touch signal line may overlap with the channel region of the thin-film transistor and cause current leakage, which in turn decreases the touch sensitivity of the device, and may result in problems with the touch display device.

Therefore, a display device with an increased manufacturing yield is needed.

BRIEF SUMMARY OF THE INVENTION

The present disclosure provides a display device, including: a first substrate, wherein the first substrate includes: a scan line extending along a first direction; a thin-film transistor, including a source electrode, a drain electrode and a channel region disposed between the source electrode and the drain electrode; a data line intersecting with the scan line and extending along a second direction, wherein the source electrode is a portion of the data line, and the thin-film transistor is coupled to the data line and the scan line; and a touch signal line is disposed above the data line, wherein the touch signal line does not overlap with the channel region; a second substrate; and a display medium disposed between the first substrate and the second substrate.

The present disclosure also provides a display device, including: a first substrate, wherein the first substrate includes: a scan line extending along a first direction; a thin-film transistor, including a source electrode, a drain electrode and a channel region disposed between the source electrode and the drain electrode; a data line intersecting with the scan line and extending along a second direction, wherein the source electrode is a portion of the data line, and the thin-film transistor is coupled to the data line and the scan line; and a touch signal line disposed above the data line and extending along the second direction, wherein the touch signal line includes a main part and a plurality of bending parts, wherein a portion of the bending parts is disposed out of a side of the data line away from the thin-film transistor; a second substrate; and a display medium disposed between the first substrate and the second substrate.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION OF THE INVENTION

The display device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/above a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

This description of the exemplary embodiments is intended to be read in connection with the accompanying drawings, which are to be considered part of the entire written description. The drawings are not drawn to scale. In addition, structures and devices are shown schematically in order to simplify the drawing.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In the embodiment of the present disclosure, the portion of the touch signal line near the thin-film transistor bypasses the channel region, so that the touch signal line does not overlap with the channel region. Therefore, when the position of the touch signal line shifts due to the manufacturing variation, the embodiment of the present disclosure may prevent the touch signal line from overlapping with the channel region and resulting current leakage at the channel region of the thin-film transistor and display problems of the products. Therefore, by having the portion of the touch signal line near the thin-film transistor bypass the channel region, the embodiment of the present disclosure may improve the manufacturing yield and display quality of the display device.

Figure 1A:
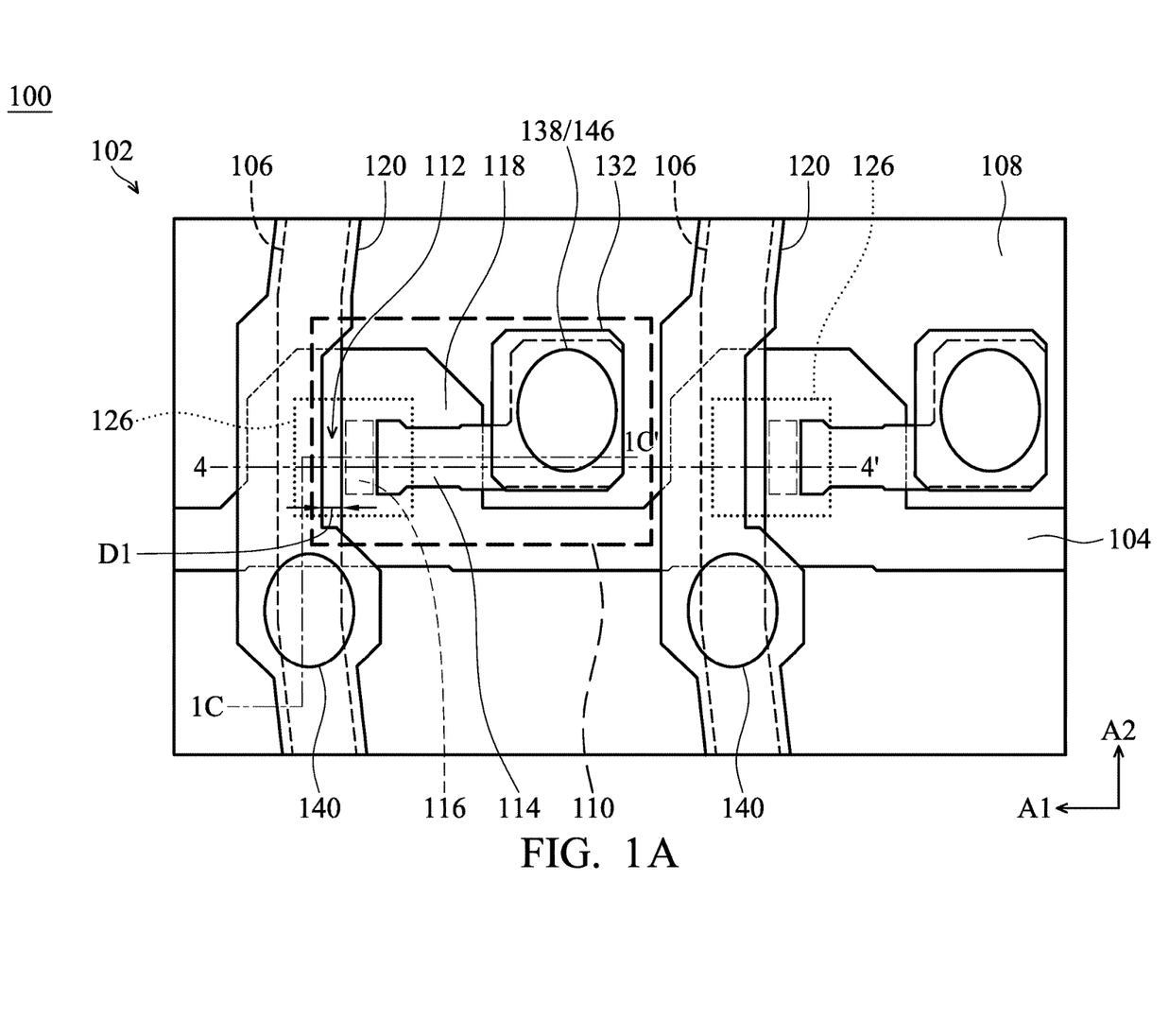
FIG. 1A is a top view of a first substrate of a display device in accordance with some embodiments of the present disclosure.

FIG. 1A is a top view of a first substrate 102 of a display device 100 in accordance with some embodiments of the present disclosure. As shown in FIG. 1A, the first substrate 102 may include a scan line (gate line) 104, which extends along a first direction A1. The first substrate 102 may further include a data line 106, which intersects with the scan line 104. In other words, the gate line 104 extends along direction A1, and the direction A2 refers to a direction that is substantially perpendicular or orthogonal to the scan-line (or gate-line) extending direction A1. In addition, the first substrate 102 may further include thin-film transistors 110 corresponding to each sub-pixel 108.

The data line 106 may provide the source signal to the sub-pixels 108 through the transistors 110. The scan line (gate line) 104 controls whether the source signal is transmitted into the sub-pixels 108 through the transistors 110. In other words, the thin-film transistor 110 is coupled to the data line 106 and the scan line 104.

The thin-film transistor 110 may include a source electrode 112, a drain electrode 114, a channel region 116 disposed between the source electrode 112 and the drain electrode 114, and a gate electrode 118. The source electrode 112 is a portion of the data line 106, and the gate electrode is a portion of the scan line.

In addition, the first substrate 102 may further include a touch signal line 120. The touch signal line 120 substantially overlaps with the data line 106 except at the region adjacent to or near the thin-film transistor 110. On the other hand, at the region adjacent to or near the thin-film transistor 110, the touch signal line 120 is disposed outside the region corresponding to the channel region 116, or the touch signal line 120 does not overlap with the channel region 116.

In the embodiment of the present disclosure, the portion of the touch signal line 120 near the thin-film transistor 110 bypasses the channel region 116, so that the touch signal line 120 does not overlap with the channel region 116. Therefore, when the position of the touch signal line 120 shifts due to the manufacturing variation, the embodiment of the present disclosure may prevent the touch signal line 120 from overlapping with the channel region 116 and resulting current leakage at the channel region 116 of the thin-film transistor 110 and display problems of the products. Therefore, by having the portion of the touch signal line 120 near the thin-film transistor 110 bypass the channel region 116, the embodiment of the present disclosure may improve the manufacturing yield and display quality of the display device 100.

In some embodiments of the present disclosure, the shortest distance D1 along the first direction A1 between the touch signal line 120 and the channel region 116 ranges from about 1.5 µm to 5.5 µm. For example, the shortest distance D1 along the first direction A1 between the touch signal line 120 and the channel region 116 may range from about 2 µm to 3 µm. It should be noted that, if the distance D1 is too short, for example shorter than 1.5 µm, the touch signal line 120 may not effectively bypass the channel region 116. However, if the distance D1 is too long, for example longer than 5.5 µm, the area of each sub-pixel would be increased, such that the number of pixels in one unit area would be decreased, which in turn decreases the display quality of the display device.

In addition, in some embodiments of the present disclosure, the touch signal line 120 is disposed above the data line 106 and extends along the direction A2. The touch signal line 120 includes a main part and a plurality of bending parts. A portion of the bending parts is disposed out of (protruded from) a side of the data line 106 away from the thin-film transistor 110 (for example, at the left side), and another portion of the bending parts cover a part of the data line 106 adjacent to the thin-film transistor 110. Preferably, the bending parts do not overlap the channel region 116 along the first direction A1. In addition, in some embodiments of the present disclosure, the angle between the main part and the adjacent bending part of the touch signal line may range from about 90 to 170 degrees.

Figure 1B:
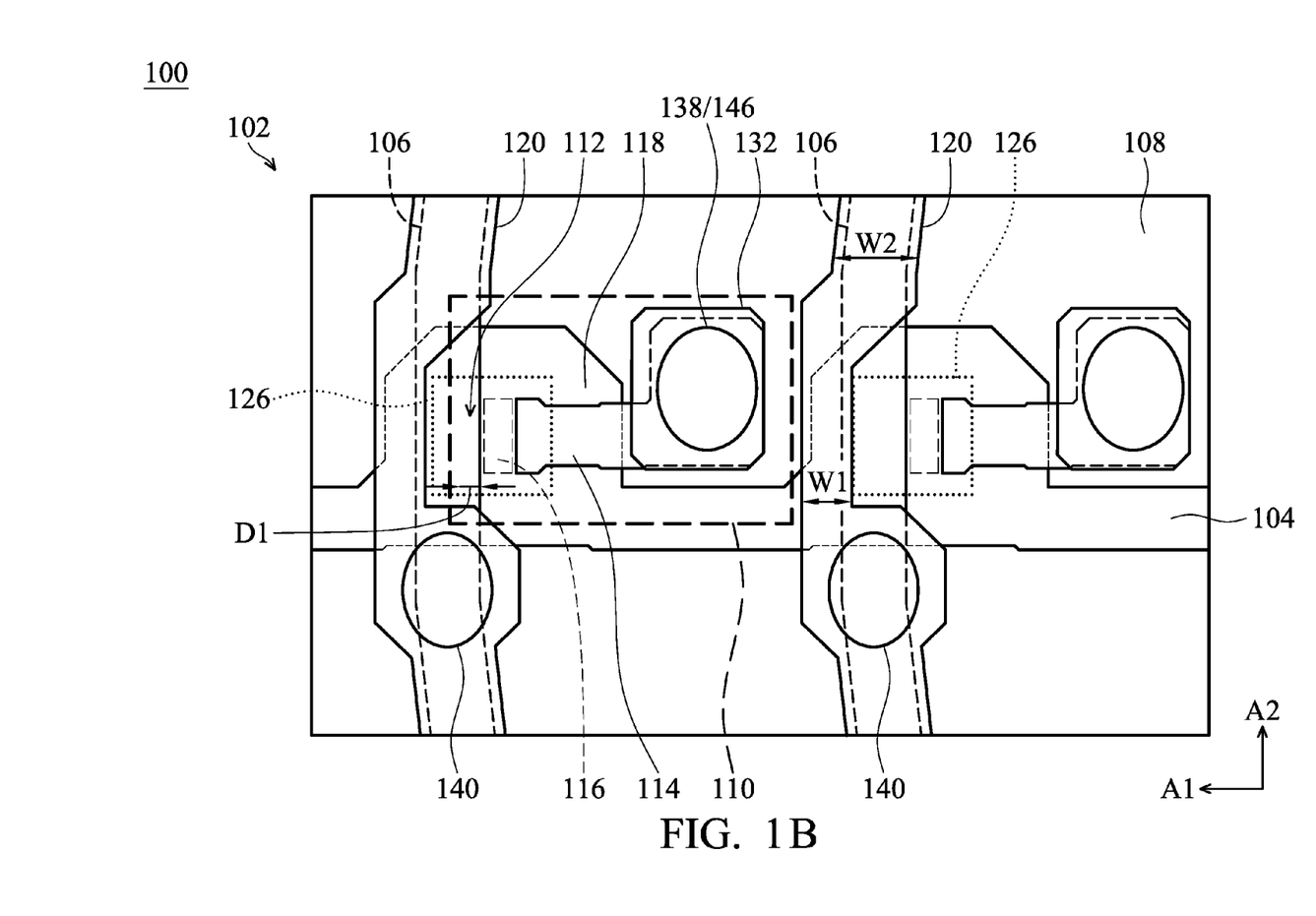
FIG. 1B is a top view of a first substrate of a display device in accordance with another embodiment of the present disclosure.

In addition, in some embodiments of the present disclosure, the touch signal line 120 has a fixed width (or constant width). However, in other embodiments of the present disclosure, the horizontal width of a portion of the touch signal line 120 near the channel region 116 is smaller than the horizontal width of the other portion of the touch signal line 120 away from the channel region 116. In particular, in some embodiments of the present disclosure, as shown in FIG. 1B, the horizontal width W1 of a portion of the touch signal line 120 near the channel region 116 is smaller than the horizontal width W2 of a portion of the touch signal line 120 away from the channel region 116.

It should be noted that, the subsequent pixel electrode and sensing electrode are not shown in FIG. 1A in order to clearly describe the present disclosure.

Figure 1C:
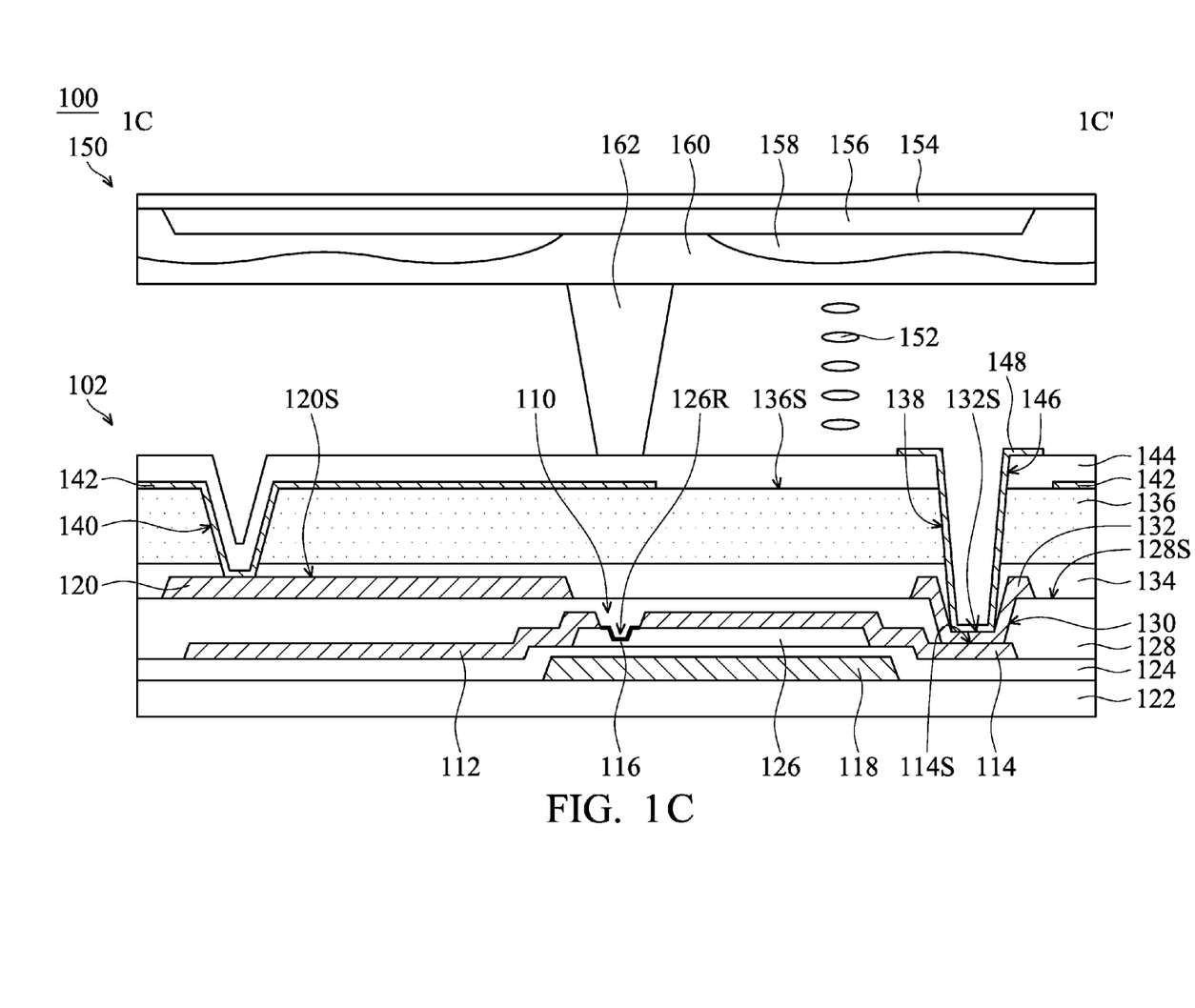
FIG. 1C is a cross-sectional view of a display device in accordance with some embodiments of the present disclosure.

FIG. 1C is a cross-sectional view of a display device 100 in accordance with some embodiments of. The present disclosure. FIG. 1C is a cross-sectional view along line 1C-1C' in FIG. 1A in accordance with some embodiments of the present disclosure. As shown in FIG. 1C, the first substrate 102 may include a substrate 122. The substrate 122 may include, but is not limited to, a transparent substrate, such as a glass substrate, a ceramic substrate, a plastic substrate, or any other suitable substrate. The thin-film transistor 110 may include a gate electrode 118 disposed above the substrate 122 and a gate dielectric layer 124 disposed above the gate electrode 118 and the substrate 122.

The material of the gate electrode 118 may include, but is not limited to, one or more metal, metal nitride, conductive metal oxide, or a combination thereof. The metal may include, but is not limited to, molybdenum, tungsten, titanium, tantalum, platinum, or hafnium. The metal nitride may include, but is not limited to, molybdenum nitride, tungsten nitride, titanium nitride or tantalum nitride. The conductive metal oxide may include, but is not limited to, ruthenium oxide or indium tin oxide. The gate electrode 118 may be formed by the sputtering, resistive thermal evaporation, electron beam evaporation, or any other suitable methods.

The material of the gate dielectric layer 124 may include, but is not limited to, silicon oxide, silicon nitride, silicon oxynitride, high-k material, any other suitable dielectric material, or a combination thereof. The high-k material may include, but is not limited to, metal oxide, metal nitride, metal silicide, transition metal oxide, transition metal nitride, transition metal silicide, transition metal oxynitride, metal aluminate, zirconium silicate, zirconium aluminate. For example, the material of the high-k material may include, but is not limited to, LaO, AlO, ZrO, TiO, $Ta_2O_5$, $Y_2O_3$, $SrTiO_3$(STO), $BaTiO_3$(BTO), BaZrO, $HfO_2$, $HfO_3$, HfZrO, HfLaO, HfSiO, HfSiON, LaSiO, AlSiO, HfTaO, HfTiO, HfTaTiO, HfAlON, $(Ba,Sr)TiO_3$(BST), $Al_2O_3$, any other suitable high-k dielectric material, or a combination thereof. The gate dielectric layer 124 may be formed by chemical vapor deposition or spin-on coating. The chemical vapor deposition may include, but is not limited to, low pressure chemical vapor deposition (LPCVD), low temperature chemical vapor deposition (LTCVD), rapid thermal chemical vapor deposition (RTCVD), plasma enhanced chemical vapor deposition (PECVD), atomic layer deposition (ALD), or any other suitable method.

The thin-film transistor 110 may further include a semiconductor layer 126 disposed above the gate dielectric layer 124. The semiconductor layer 126 overlaps with the gate electrode 118. In addition, a first end of the source electrode 112 and a second end of the drain electrode 114 are disposed above the semiconductor layer 126, and the first end of the source electrode 112 and the second end of the drain electrode 114 respectively overlap with a portion of the semiconductor layer 126.

The semiconductor layer 126 may include an element semiconductor which may include silicon, germanium; a compound semiconductor which may include gallium nitride (GaN), silicon carbide, gallium arsenide, gallium phosphide, indium phosphide, indium arsenide and/or indium antimonide; an alloy semiconductor which may include SiGe, GaAsP, AlInAs, AlGaAs, GaInAs, GaInP and/or GaInAsP; or a combination thereof.

The source electrode 112 and drain electrode 114 may include, but is not limited to, copper, aluminum, molybdenum, tungsten, gold, cobalt, nickel, platinum, titanium, iridium, rhodium, an alloy thereof, a combination thereof, or any other conductive material. For example, the source electrode 112 and drain electrode 114 may include three-layered structure such as Mo/Al/Mo or Ti/Al/Ti. The material of the source electrode 112 and drain electrode 114 may be formed by sputtering, resistive thermal evaporation, electron beam evaporation, or any other suitable method. In some embodiments, the materials of the source electrode 112 and drain electrode 114 may be the same, and the source electrode 112 and drain electrode 114 may be formed by the same deposition steps. However, in other embodiments, the source electrode 112 and drain electrode 114 may be formed by different deposition steps, and the materials of the source electrode 112 and drain electrode 114 may be different from each other.

In this embodiment, a portion of the semiconductor layer 126 between the first end and the second end is the channel region 116. In other words, the region of the semiconductor layer 126 corresponding to the shortest distance between the source electrode 112 and the drain electrode 114 is the channel region 116.

Still referring to FIG. 1C, the first substrate 102 may further include a first insulating layer 128 covering the thin-film transistor 110. The material of the first insulating layer 128 may include, but is not limited to, silicon nitride, silicon oxide, or silicon oxynitride. The first insulating layer 128 may be formed by chemical vapor deposition or spin-on coating. The chemical vapor deposition may include, but is not limited to, low pressure chemical vapor deposition (LPCVD), low temperature chemical vapor deposition (LTCVD), rapid thermal chemical vapor deposition (RTCVD), plasma enhanced chemical vapor deposition (PECVD), atomic layer deposition (ALD), or any other suitable method.

In this embodiment, the touch signal line 120 is disposed above the first insulating layer 128. In addition, the first insulating layer 128 has an opening 130. The opening 130 exposes a portion of the surface 114S of the drain electrode 114. In addition, the first substrate 102 may further include a liner layer 132 disposed above a portion of the first insulating layer 128. The liner layer 132 connects the surface 114S of the drain electrode 114.

The touch signal line 120 and liner layer 132 may include, but is not limited to, copper, aluminum, molybdenum, tungsten, gold, cobalt, nickel, platinum, titanium, iridium, rhodium, an alloy thereof, a combination thereof, or any other conductive material. For example, the touch signal line 120 and liner layer 132 may include three-layered structure such as Mo/Al/Mo or Ti/Al/Ti. The material of the touch signal line 120 and liner layer 132 may be formed by sputtering, resistive thermal evaporation, electron beam evaporation, or any other suitable method. In some embodiments, the materials of the touch signal line 120 and liner layer 132 may be the same, and the touch signal line 120 and liner layer 132 may be formed by the same deposition steps. However, in other embodiments, the touch signal line 120 and liner layer 132 may be formed by different deposition steps, and the materials of the touch signal line 120 and liner layer 132 may be different from each other.

In some embodiments of the present disclosure, by forming the opening 130 and the liner layer 132, the number of insulating layers need to be etched (to form openings to make the pixel electrode electrically connected to the drain electrode) may be decreased, which in turn improves the manufacturing yield.

Still referring to FIG. 1C, the first substrate 102 may further include a second insulating layer 134 disposed above the first insulating layer 128 and covering the touch signal line 120. The material of the second insulating layer 134 may include, but is not limited to, silicon nitride, silicon oxide, or silicon oxynitride. The second insulating layer 134 may be formed by chemical vapor deposition or spin-on coating. Subsequently, a planar layer 136 may be optionally disposed above the second insulating layer 134. The planar layer 136 may include, but is not limited to, organic insulating materials (such as photosensitive resins) or inorganic insulating materials (such as silicon nitride, silicon oxide, silicon oxynitride, silicon carbide, aluminum oxide, or a combination thereof).

In addition, in some embodiments of the present disclosure, the second insulating layer 134 and the planar layer 136 may be etched by two etching steps respectively to form an opening 138 and an opening 140. The opening 138 exposes a portion of the surface 132S of the liner layer 132, and the opening 140 exposes a portion of the surface 120S of the touch signal line 120.

Still referring to FIG. 1C, the first substrate 102 may further include a sensing electrode 142 disposed above the second insulating layer 134 (or above the planar layer 136) and electrically connected to the touch signal line 120. In particular, the sensing electrode 142 is disposed above the second insulating layer 134 (or above the planar layer 136) and extends onto the sidewall of the opening 140 and onto the top surface 120S of the touch signal line 120.

The material of the sensing electrode 142 may include, but is not limited to, transparent conductive material such as indium tin oxide (ITO), tin oxide (SnO), indium zinc oxide (IZO), indium gallium zinc oxide (IGZO), indium tin zinc oxide (ITZO), antimony tin oxide (ATO), antimony zinc oxide (AZO), a combination thereof, or any other suitable transparent conductive oxide. In addition, the sensing electrode 142 not only serves as the sensing electrode of the display device when the display device is touched, but it also serves as the common electrode of the display device. In some embodiments, the driving method for touch-control may include the self-capacitive type. In addition, in some embodiments of the present disclosure, one sensing electrode 142 may be electrically connected to two touch signal lines 120 through two openings 140 (for example, the two openings 140 shown in FIG. 1A). In addition, one sensing electrode 142 is disposed corresponding to a plurality of the sub-pixels 108 shown in FIG. 1A.

Still referring to FIG. 1C, the first substrate 102 may further include a patterned third insulating layer 144 disposed above the second insulating layer 134 (or the planar layer 136) and covering the sensing electrode 142. The material of the third insulating layer 144 may include, but is not limited to, silicon nitride, silicon oxide, or silicon oxynitride. The third insulating layer 144 may be formed by chemical vapor deposition or spin-on coating. The third insulating layer 144 has an opening 146. The opening 146 connects the opening 138. The planar layer 136 is disposed between the second insulating layer 134 and the third insulating layer 144.

The first substrate 102 may further include a pixel electrode 148 disposed above the third insulating layer 144 and electrically connected to the drain electrode 114. In particular, the pixel electrode 148 is disposed above the a portion of the third insulating layer 144 and extends onto the sidewall of the opening 146 and 138 and onto the surface 132S of the liner layer 132 to electrically connect the drain electrode 114.

In addition, still referring to FIG. 1C, display device 100 further includes a second substrate 150 disposed opposite the first substrate 102, and a display medium 152 disposed between the first substrate 102 and the second substrate 150.

The display device 100 may include, but is not limited to, a touch liquid-crystal display such as a thin-film transistor liquid-crystal display. The liquid-crystal display may include, but is not limited to, a twisted nematic (TN) liquid-crystal display, a super twisted nematic (STN) liquid-crystal display, a double layer super twisted nematic (DSTN) liquid-crystal display, a vertical alignment (VA) liquid-crystal display, an in-plane switching (IPS) liquid-crystal display, a cholesteric liquid-crystal display, a blue phase liquid-crystal display, fringe field switching liquid-crystal display, or any other suitable liquid-crystal display.

In some embodiments of the present disclosure, the second substrate 150 serves as a color filter substrate. In particular, the second substrate 150, which serves as a color filter substrate, may include a substrate 154, a light-shielding layer 156 disposed above the substrate 154, a color filter layer 158 disposed above the substrate 154, and a planar layer 160 covering the light-shielding layer 156 and the color filter layer 158.

The substrate 154 may include a transparent substrate such as a glass substrate, a ceramic substrate, a plastic substrate, or any other suitable transparent substrate. The light-shielding layer 156 may include, but is not limited to, black photoresist, black printing ink, black resin. The color filter layer 158 may include a red color filter layer, a green color filter layer, a blue color filter layer, or any other suitable color filter layer.

The display device 100 further includes a spacer 162 disposed between the first substrate 102 and second substrate 150. The spacer 162 is the main structure used to space the first substrate 102 apart from the second substrate 150 to prevent the first substrate 102 from touching the second substrate 150 when the display device 100 is pressed or touched.

Figure 2A:
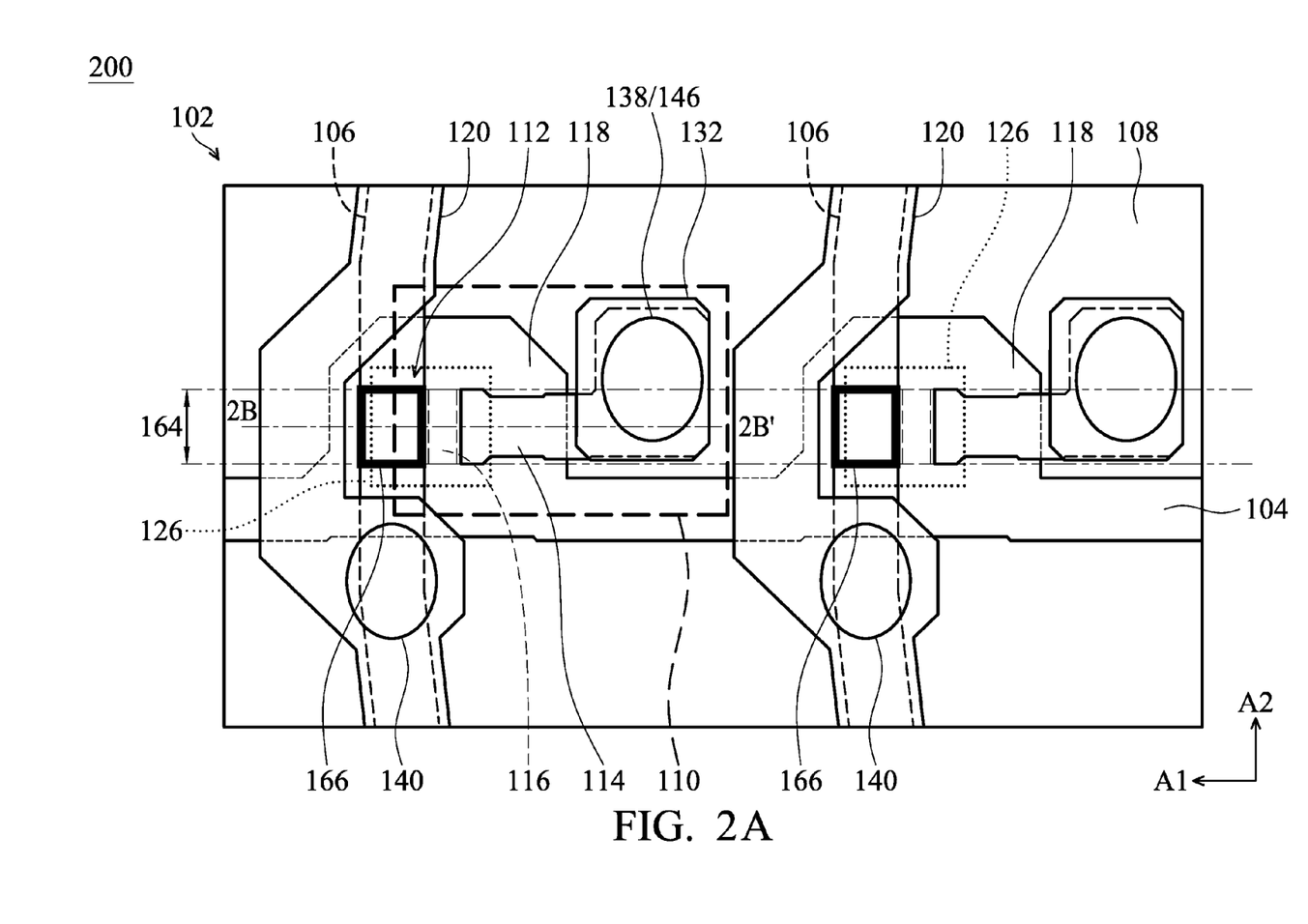
FIG. 2A is a top view of a first substrate of a display device in accordance with another embodiment of the present disclosure.
Figure 2B:
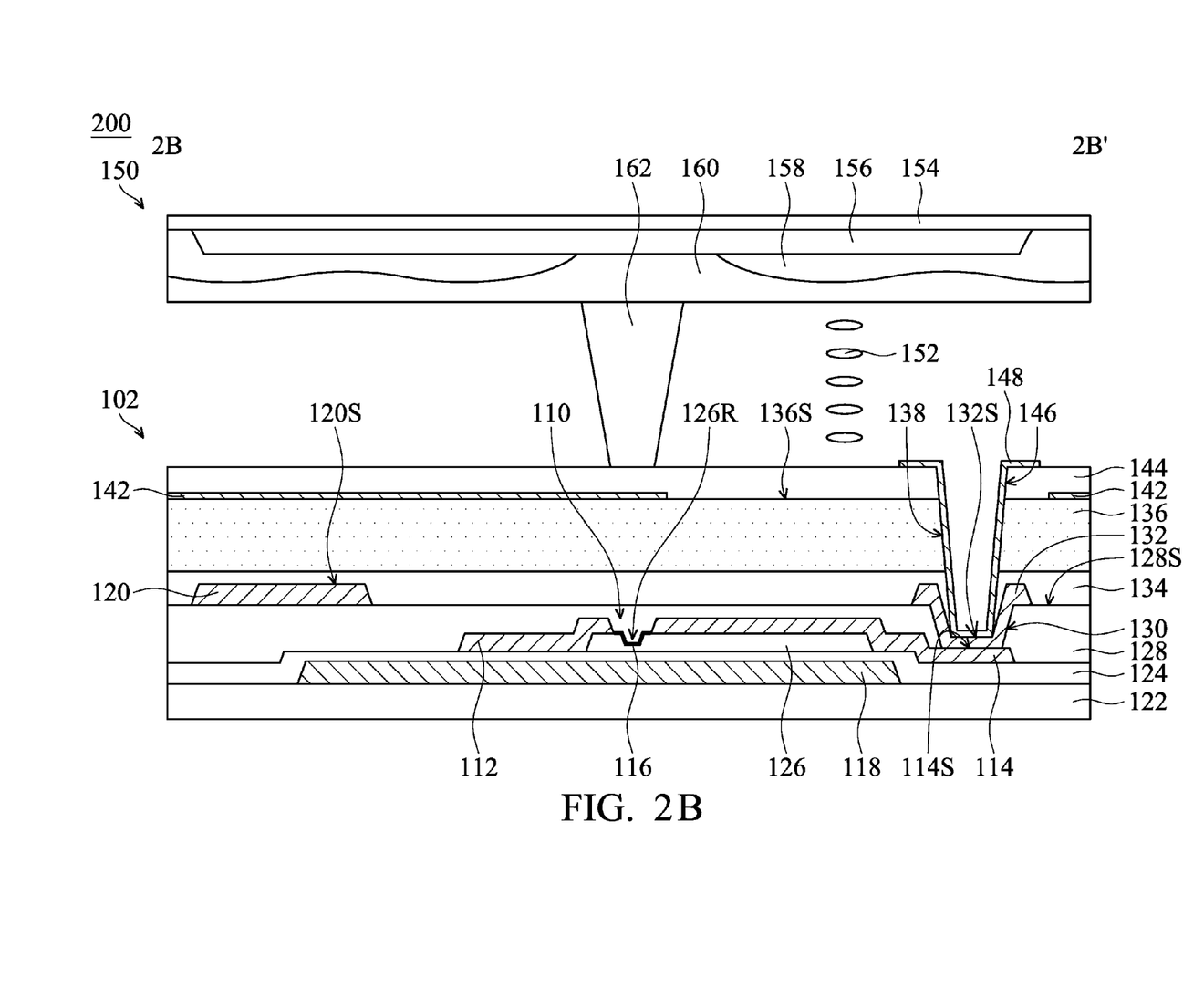
FIG. 2B is a cross-sectional view of a display device in accordance with another embodiment of the present disclosure.

It should be noted that the exemplary embodiment set forth in FIGS. 1A-1C is merely for the purpose of illustration. In addition to the embodiment set forth in FIGS. 1A-1C, the touch signal line may have other configurations, as shown in FIGS. 2A-2B. This will be described in detail in the following description. Therefore, the inventive concept and scope are not limited to the exemplary embodiment shown in FIGS. 1A-1C.

Note that the same or similar elements or layers corresponding to those of the semiconductor device are denoted by like reference numerals. The same or similar elements or layers denoted by like reference numerals have the same meaning and will not be repeated for the sake of brevity.

FIG. 2A is a top view of a first substrate 102 of a display device 200 in accordance with another embodiment of. The present disclosure. FIG. 2B is a cross-sectional view of a display device 200 in accordance with another embodiment of. The present disclosure. FIG. 2B is a cross-sectional view along line 2B-2B' in FIG. 2A in accordance with some embodiments of the present disclosure. As shown in FIG. 2A, the display device 200 may include an extending region 164. The extending region 164 is defined by extending the region corresponding to the channel region 116 along the first direction A1. The extending region 164 and the adjacent data line 106 form an overlapping region 166, and the touch signal line 120 is disposed outside the overlapping region 166. The difference between the embodiment shown in FIGS. 2A-2B and the embodiment shown in FIGS. 1A-1C is that in the extending region 164, a portion of the touch signal line 120 adjacent to the overlapping region 166 does not overlap with the overlapping region 166. In other words, the touch signal line 120 is disposed outside the overlapping region 166.

Figure 3:
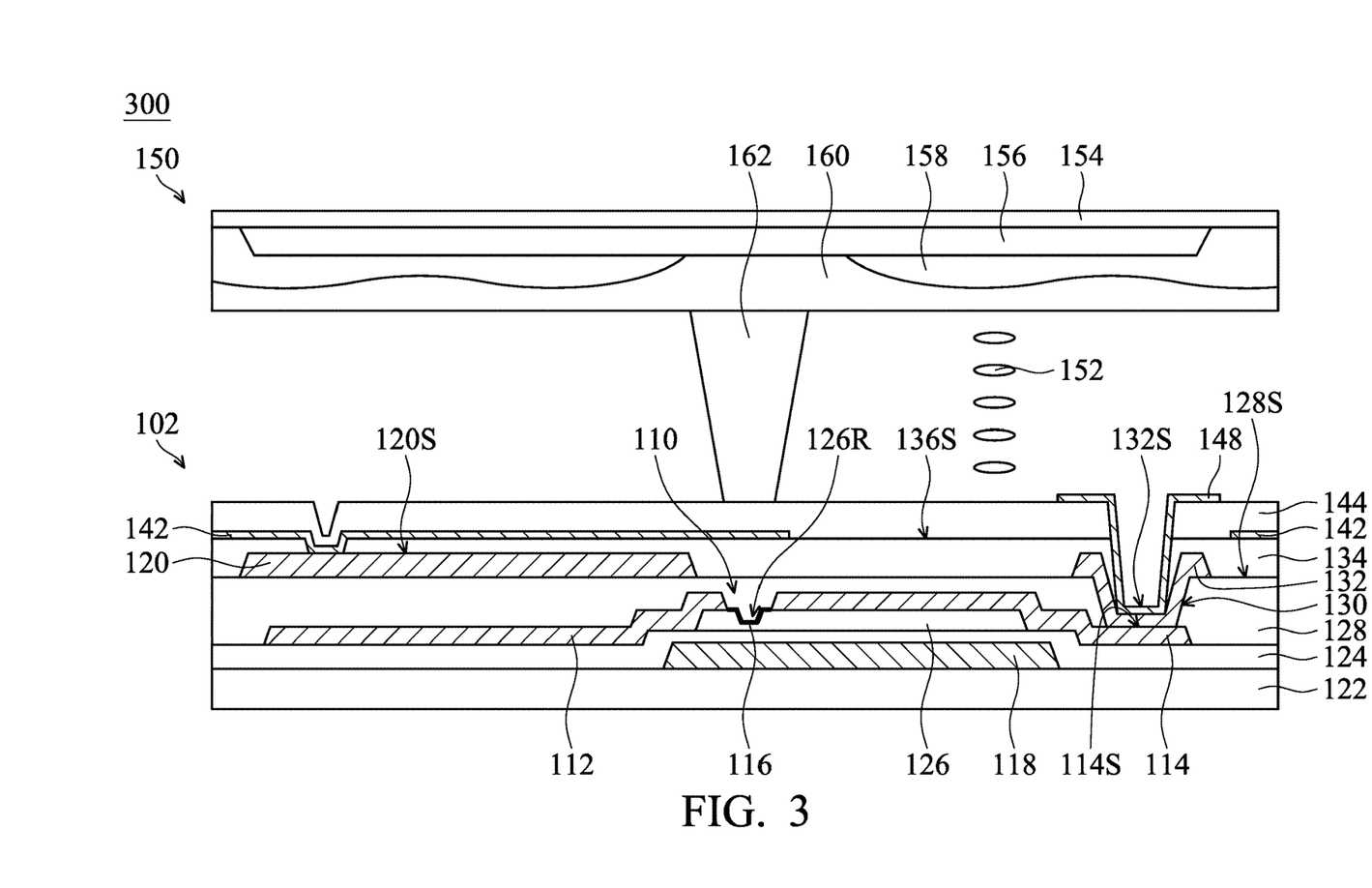
FIG. 3 is a cross-sectional view of a display device in accordance with another embodiment of the present disclosure.

FIG. 3 is a cross-sectional view of a display device 300 in accordance with another embodiment of. The present disclosure. The difference between the embodiment shown in FIG. 3 and the embodiment shown in FIGS. 1A-2B is that the display device 300 does not include the aforementioned planar layer. Therefore, the second insulating layer 134 is in direct contact with the third insulating layer 144.

Figure 4:
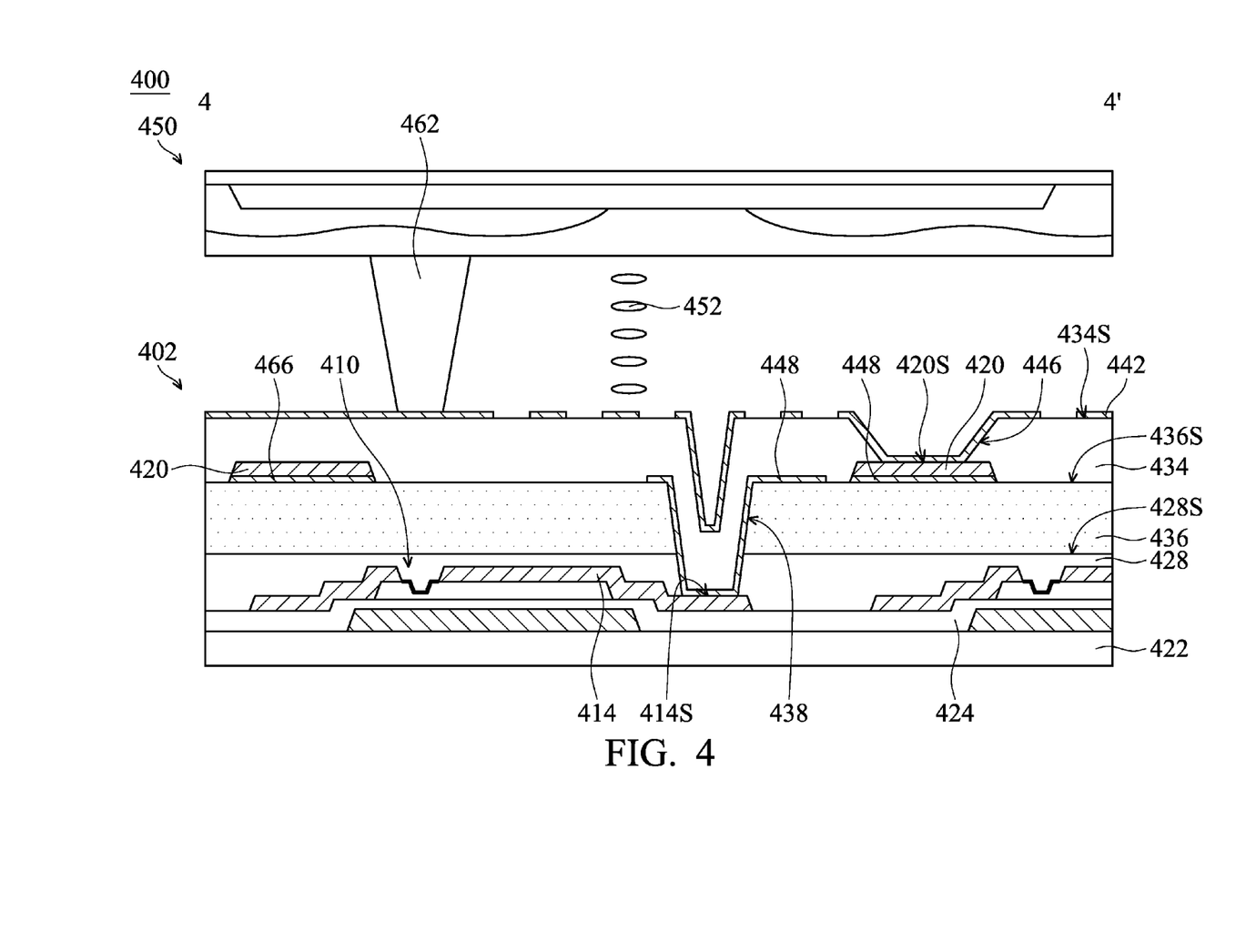
FIG. 4 is a cross-sectional view of a display device in accordance with another embodiment of the present disclosure.

It should be noted that the exemplary embodiment set forth in FIGS. 1A-3 is merely for the purpose of illustration. In addition to the embodiment set forth in FIGS. 1A-3, the sensing electrode, the pixel electrode and the touch signal line may have other configurations, as shown in FIG. 4. This will be described in detail in the following description. Therefore, the inventive concept and scope are not limited to the exemplary embodiment shown in FIGS. 1A-3.

Note that the same or similar elements or layers corresponding to those of the semiconductor device are denoted by like reference numerals. The same or similar elements or layers denoted by like reference numerals have the same meaning and will not be repeated for the sake of brevity.

FIG. 4 is a cross-sectional view of a display device 400 in accordance with another embodiment of. The present disclosure. FIG. 4 is a cross-sectional view along line 4-4' in FIG. 1A in accordance with some embodiments of the present disclosure. As shown in FIG. 4, the first substrate 402 of the display device 400 may include a substrate 422 and a thin-film transistor 410 disposed above the substrate 422. The first substrate 402 may further include a first insulating layer 428 covering the thin-film transistor 410.

Subsequently, a planar layer 436 may be optionally disposed above the first insulating layer 428. The planar layer 436 may include, but is not limited to, organic insulating materials (such as photosensitive resins) or inorganic insulating materials (such as silicon nitride, silicon oxide, silicon oxynitride, silicon carbide, aluminum oxide, or a combination thereof).

In addition, in some embodiments of the present disclosure, the first insulating layer 428 and the planar layer 436 may be etched by two etching steps respectively to form an opening 438. The opening 438 extends from the top surface 436S of the planar layer 436 downward to the surface 414S of the drain electrode 414. The opening 438 exposes a portion of the surface 414S of the drain electrode 414.

In addition, as shown in FIG. 4, the touch signal line 420 is disposed above the first insulating layer 428 (or over the planar layer 436). The touch signal line 420 may include, but is not limited to, copper, aluminum, molybdenum, tungsten, gold, cobalt, nickel, platinum, titanium, iridium, rhodium, an alloy thereof, a combination thereof, or any other conductive material. For example, the touch signal line 420 may include three-layered structure such as Mo/Al/Mo or Ti/Al/Ti.

Still referring to FIG. 4, the pixel electrode 448 is disposed above the first insulating layer 428 and is electrically connected to the drain electrode 414. In addition, a portion of the pixel electrode 448 is disposed between the first insulating layer 428 and the touch signal line 420 to increase the adhesion between the touch signal line 420 and the first insulating layer 428. The material of the pixel electrode 448 may include, but is not limited to, transparent conductive material such as indium tin oxide (ITO), tin oxide (SnO), indium zinc oxide (IZO), indium gallium zinc oxide (IGZO), indium tin zinc oxide (ITZO), antimony tin oxide (ATO), antimony zinc oxide (AZO), a combination thereof, or any other suitable transparent conductive oxide.

Still referring to FIG. 4, the display device 400 may further include a second insulating layer 434 disposed above the first insulating layer 428 (or above the planar layer 436) and covering the touch signal line 420 and the pixel electrode 448. The planar layer 436 is disposed between the first insulating layer 428 and the second insulating layer 434. The second insulating layer 434 has an opening 446. The display device 400 may further include a sensing electrode 442 disposed above the second insulating layer 434 and electrically connected to the touch signal line 420. In particular, the sensing electrode 442 is disposed above the second insulating layer 434, and is electrically connected to the touch signal line 420. In addition, the sensing electrode 442 not only serves as the sensing electrode of the display device when the display device is touched, but it also serves as the common electrode of the display device. In some embodiments, the driving method for touch-control may include the self-capacitive type.

In addition, display device 400 further includes a second substrate 450 disposed opposite the first substrate 402, a display medium 452 disposed between the first substrate 402 and the second substrate 450, and a spacer 462 disposed between the first substrate 402 and the second substrate 450.

Figure 5:
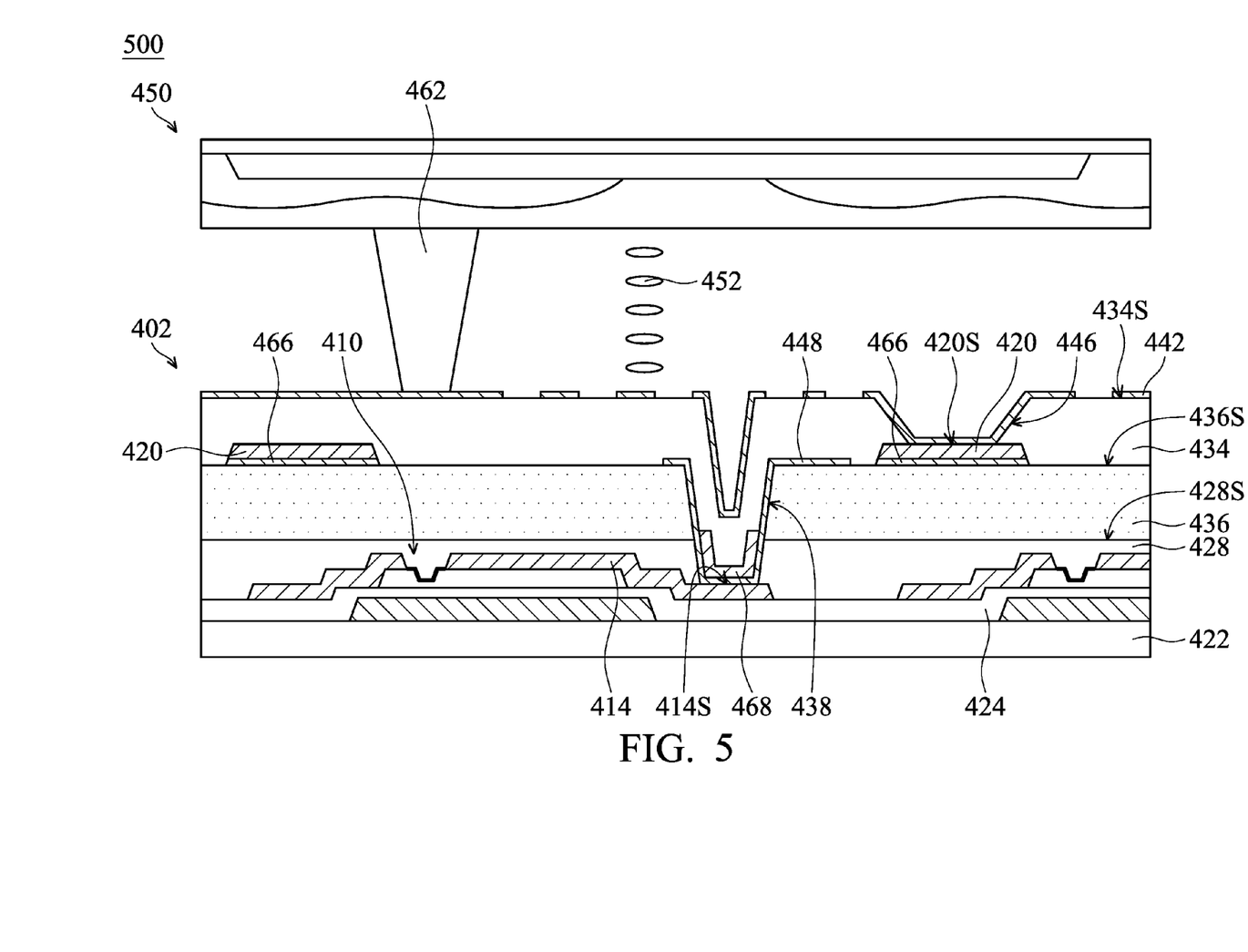
FIG. 5 is a cross-sectional view of a display device in accordance with another embodiment of the present disclosure.

FIG. 5 is a cross-sectional view of a display device 500 in accordance with another embodiment of. The present disclosure. The difference between the embodiment shown in FIG. 5 and the embodiment shown in FIG. 4 is that the first substrate 402 further include a liner layer 468 disposed above the pixel electrode 448 in the opening 438.

The liner layer 468 and the touch signal line 420 may include, but is not limited to, copper, aluminum, molybdenum, tungsten, gold, cobalt, nickel, platinum, titanium, iridium, rhodium, an alloy thereof, a combination thereof, or any other conductive material. For example, the liner layer 468 and the touch signal line 420 may include three-layered structure such as Mo/Al/Mo or Ti/Al/Ti. The material of the liner layer 468 and the touch signal line 420 may be formed by sputtering, resistive thermal evaporation, electron beam evaporation, or any other suitable method. In some embodiments, the materials of the liner layer 468 and the touch signal line 420 may be the same, and the liner layer 468 and the touch signal line 420 may be formed by the same deposition steps. However, in other embodiments, the liner layer 468 and the touch signal line 420 may be formed by different deposition steps, and the materials of the liner layer 468 and the touch signal line 420 may be different from each other.

By disposing the liner layer 468 above the pixel electrode 448 in the opening 438, the embodiments of the present disclosure may prevent metal with an uncontrollable shape from remaining in the opening 438 when forming the touch signal line 420. Alternatively, the embodiments of the present disclosure may make the surface in the opening 438 complete to prevent the breakage or disconnection of the pixel electrode 448 in the opening. Since if the three-layered structure is a metal structure with an uncontrollable shape such as Mo/Al/Mo, the middle Al may protrude outward and result in a short circuit between the pixel electrode 448 and the sensing electrode 442. Therefore, by disposing the liner layer 468 above the pixel electrode 448 in the opening 438, the embodiments of the present disclosure may prevent the aforementioned short circuit or disconnection, which in turn improves the manufacturing yield.

Figure 6:
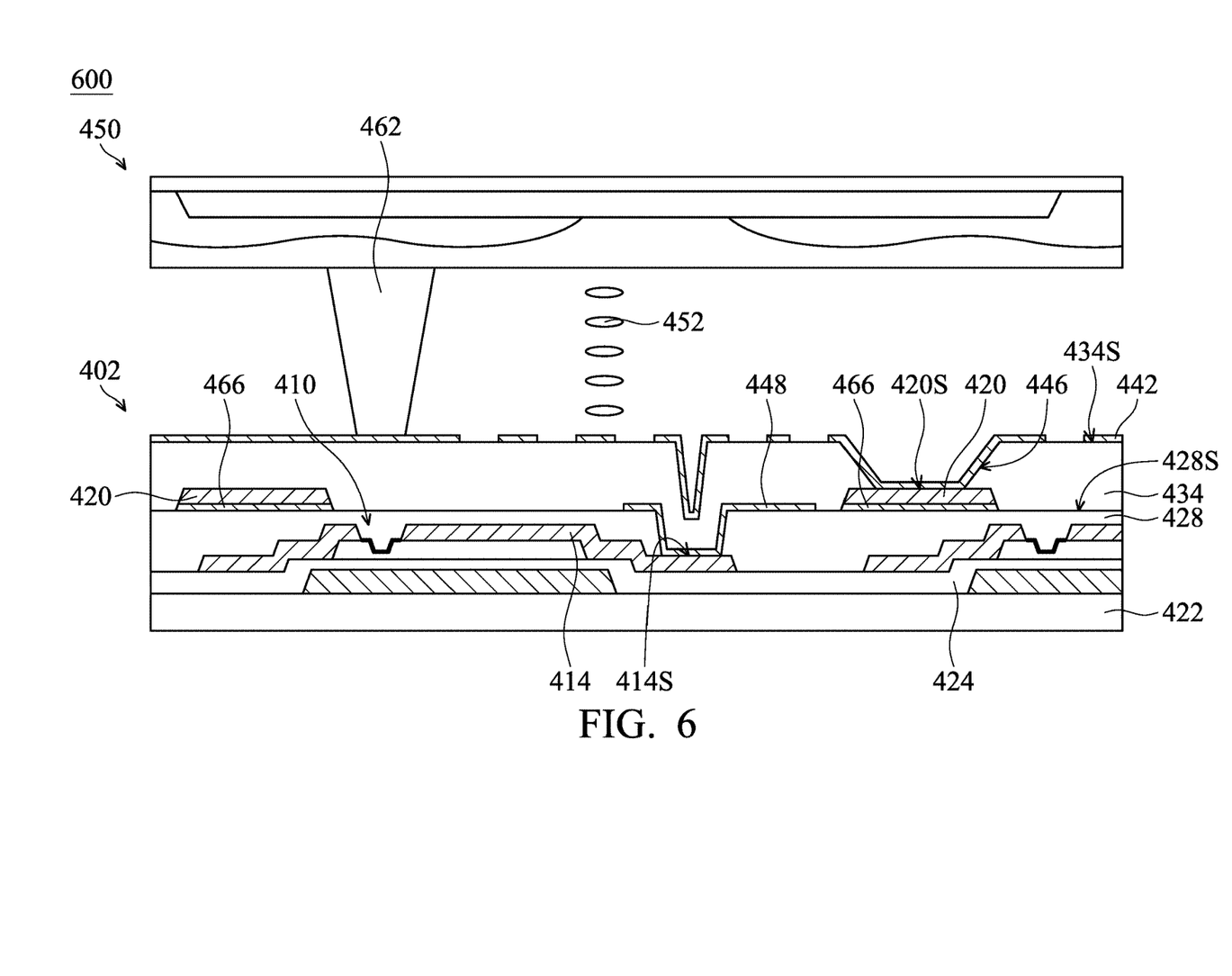
FIG. 6 is a cross-sectional view of a display device in accordance with another embodiment of the present disclosure.

FIG. 6 is a cross-sectional view of a display device 600 in accordance with another embodiment of. The present disclosure. The difference between the embodiment shown in FIG. 6 and the embodiment shown in FIGS. 4-5 is that the display device 600 does not include the aforementioned planar layer. Therefore, the first insulating layer 428 is in direct contact with the second insulating layer 434.

In summary, in the embodiment of the present disclosure, the portion of the touch signal line (touch line) near the thin-film transistor bypasses the channel region, so that the touch signal line does not overlap with the channel region. Therefore, when the position of the touch signal line shifts due to the manufacturing variation, the embodiment of the present disclosure may prevent the touch signal line from overlapping with the channel region and resulting current leakage at the channel region of the thin-film transistor and display problems of the products. Therefore, by having the portion of the touch signal line near the thin-film transistor bypass the channel region, the embodiment of the present disclosure may improve the manufacturing yield and display quality of the display device.

Note that the above element sizes, element parameters, and element shapes are not limitations of the present disclosure. Those skilled in the art can adjust these settings or values according to different requirements. It should be understood that the display device of the present disclosure are not limited to the configurations of FIGS. 1A to 6. The present disclosure may merely include any one or more features of any one or more embodiments of FIGS. 1A to 6. In other words, not all of the features shown in the figures should be implemented in the display device of the present disclosure.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display device, comprising:
   a first substrate, wherein the first substrate comprises:
   a scan line extending along a first direction;
   a thin-film transistor, comprising a source electrode, a drain electrode and a channel region disposed between the source electrode and the drain electrode;
   a data line intersecting with the scan line and extending along a second direction, wherein the source electrode is a portion of the data line, and the thin-film transistor is coupled to the data line and the scan line; and
   a touch signal line is disposed above the data line, wherein the touch signal line does not overlap with the channel region;
   wherein a shortest distance along the first direction between the touch signal line and the channel region ranges from about 1.5 µm to 5.5 µm;
   a second substrate; and
   a display medium disposed between the first substrate and the second substrate.

2. The display device as claimed in claim 1, wherein the thin-film transistor further comprises:
   a gate electrode;
   a gate dielectric layer disposed above the gate electrode; and
   a semiconductor layer disposed above the gate dielectric layer and overlapping with the gate electrode, wherein the source electrode and the drain electrode are disposed above the semiconductor layer, and a first end of the source electrode and a second end of the drain electrode overlap with the semiconductor layer,
   wherein a portion of the semiconductor layer between the first end and the second end is the channel region.

3. The display device as claimed in claim 1, further comprising:
   an extending region, wherein the extending region is a region where the channel region extends along the first direction, the extending region and the data line form an overlapping region,
   wherein the touch signal line extends along the second direction, and a portion of the touch signal line adjacent to the overlapping region does not overlap with the overlapping region.

4. The display device as claimed in claim 1, wherein the first substrate further comprises:
   a first insulating layer covering the thin-film transistor and exposing a portion of the drain electrode, wherein the touch signal line is disposed above the first insulating layer;

a second insulating layer disposed above the first insulating layer and exposing a portion of the touch signal line;

a sensing electrode disposed above the second insulating layer and electrically connected to the touch signal line;

a third insulating layer disposed above the second insulating layer and exposing a portion of the drain electrode; and a pixel electrode disposed above the third insulating layer and electrically connected to the drain electrode.

5. The display device as claimed in claim 1, wherein the first substrate further comprises:

a first insulating layer covering the thin-film transistor, wherein the touch signal line is disposed above the first insulating layer, wherein the first insulating layer has an opening exposing the drain electrode;

a pixel electrode disposed above the first insulating layer and electrically connected to the drain electrode;

a second insulating layer disposed above the first insulating layer and exposing a portion of the touch signal line; and a sensing electrode disposed above the second insulating layer and electrically connected to the touch signal line.

6. The display device as claimed in claim 5, wherein a portion of the pixel electrode is disposed between the touch signal line and the first insulating layer.

7. The display device as claimed in claim 5, wherein the first substrate further comprises:

a liner layer disposed in the opening and disposed between the pixel electrode and the second insulating layer.

8. A display device, comprising:

a first substrate, wherein the first substrate comprises:

a scan line extending along a first direction;

a thin-film transistor, comprising a source electrode, a drain electrode and a channel region disposed between the source electrode and the drain electrode;

a data line intersecting with the scan line and extending along a second direction, wherein the source electrode is a portion of the data line, and the thin-film transistor is coupled to the data line and the scan line; and a touch signal line is disposed above the data line, wherein the touch signal line does not overlap with the channel region;

a second substrate; and a display medium disposed between the first substrate and the second substrate, wherein the touch signal line extends along the second direction, and a horizontal width of a portion of the touch signal line near the channel region is smaller than a horizontal width a portion of the touch signal line away from the channel region.

9. A display device, comprising:

a first substrate, wherein the first substrate comprises:

a scan line extending along a first direction;

a thin-film transistor, comprising a source electrode, a drain electrode and a channel region disposed between the source electrode and the drain electrode;

a data line intersecting with the scan line and extending along a second direction, wherein the source electrode is a portion of the data line, and the thin-film transistor is coupled to the data line and the scan line; and a touch signal line disposed above the data line and extending along the second direction, wherein the touch signal line comprises a main part and a plurality of bending parts, wherein a portion of the bending parts is disposed out of a side of the data line away from the thin-film transistor;

a second substrate; and a display medium disposed between the first substrate and the second substrate.

10. The display device as claimed in claim 9, wherein the portion of the bending parts does not overlap with the channel region.

11. The display device as claimed in claim 9, further comprising:

an extending region, wherein the extending region is a region where the channel region extends along the first direction, the extending region and the data line form an overlapping region, wherein the touch signal line extends along the second direction, and the portion of the bending parts does not overlap with the overlapping region.

12. The display device as claimed in claim 9, wherein an angle between the main part and the adjacent bending part of the touch signal line may range from about 90 to 170 degrees.

* * * * *